(12) United States Patent
Ebert

(10) Patent No.: US 7,099,745 B2
(45) Date of Patent: Aug. 29, 2006

(54) ROBOT SYSTEM USING VIRTUAL WORLD

(75) Inventor: Peter S. Ebert, Menlo Park, CA (US)

(73) Assignee: Sap Aktiengesellschaft, Walldorf (DE)

( * ) Notice: Subject to any disclaimer, the term of this patent is extended or adjusted under 35 U.S.C. 154(b) by 257 days.

(21) Appl. No.: 10/691,971

(22) Filed: Oct. 24, 2003

(65) Prior Publication Data
US 2005/0090933 A1    Apr. 28, 2005

(51) Int. Cl.
G06F 19/00    (2006.01)
(52) U.S. Cl. .................. 700/245; 700/258; 701/2; 701/3; 701/16; 701/36; 340/961; 244/189
(58) Field of Classification Search .......... 700/245, 700/258; 318/568.16; 709/224; 701/2, 701/3, 16, 36; 340/961; 244/189
See application file for complete search history.

(56) References Cited

U.S. PATENT DOCUMENTS

| 5,341,459 | A | * | 8/1994 | Backes ................. 700/260 |
| 5,381,158 | A | * | 1/1995 | Takahara et al. ......... 345/156 |
| 5,802,494 | A | * | 9/1998 | Kuno ..................... 705/2 |
| 5,844,392 | A | * | 12/1998 | Peurach et al. ......... 318/568.17 |
| 6,074,155 | A | * | 6/2000 | Hirschek ................. 414/273 |
| 6,304,050 | B1 | * | 10/2001 | Skaar et al. ........... 318/568.11 |
| 6,445,964 | B1 | * | 9/2002 | White et al. .............. 700/61 |
| 6,965,816 | B1 | * | 11/2005 | Walker .................. 701/16 |
| 2003/0093187 | A1 | * | 5/2003 | Walker .................. 701/1 |

FOREIGN PATENT DOCUMENTS

| EP | 1 092 458 A | 4/2001 |
| WO | WO 02/081156 A | 10/2002 |
| WO | WO 03/060752 A | 7/2003 |

OTHER PUBLICATIONS

Gary, Dr. Robot Tested at Hopkins, 3003, Internet, p. 1 of 1.*
Anousaki, G.C., et al., "Simultaneous Localization and Map Building for Mobile Robot Navigation," *IEEE Robotics & Automation Magazine*, v. 6, No. 3, Sep. 30, 1999, pp. 42-53, XP002295580.
Freund, E., et al., "Intelligent Autonomous Robots for Industrial and Space Applications," Sep. 12, 1994, *Proceedings of the IEEE/RSJ/GI International Conference on Intelligent Robots and Systems: Advanced Robotics and the Real World*, Munich, Germany, XP000514615, 8 pgs.
Freund, E., et al, "Toward Realistic Simulation of Robotic Workcells," Advanced Robotic Systems and the Real World, Sep. 12, 1994, *Proceedings of the IEEE/RSJ/GI International Conference on Intelligent Robots and Systems: Advanced Robotice and the Real World*, pp. 39-46, XP010141842.

* cited by examiner

*Primary Examiner*—Thomas G. Black
*Assistant Examiner*—McDieunel Marc
(74) *Attorney, Agent, or Firm*—Fish & Richardson P.C.

(57) ABSTRACT

A robot system, operable to perform a task, is integrated on a robot with a sensor, a control module, and a virtual world. The virtual world represents a generic continuum including a collection of information replicating the spatial and temporal properties of a number of articles and related circumstances in an environment of the robot system. As the virtual world provides a common space-time reference for all of the articles, including the robot system itself, the robot system may perform its task in an efficient and robust manner. For example, the robot may move about its environment without colliding with the other articles. Further, the virtual world may include predicted information about the articles, including an anticipated position or condition of the article at a particular time. In this way, the robot system may perform its task in a timely manner, since its operations can be synchronized with the other articles and an idle time may be reduced.

25 Claims, 5 Drawing Sheets

ROBOT SYSTEM USING VIRTUAL WORLD

TECHNICAL FIELD

This description relates to robots for performing tasks.

BACKGROUND

Conventional robot systems are often fixed in space, and may include various sensors and actuators designed to enable performance of a specific task or tasks. Conventional robot systems often receive instructions from a limited number of sources, such as, for example, a local processor or a non-local process control system. Although a conventional robot system may function in an environment that includes other automated systems, it may be unable to dynamically interact with those systems in a sufficiently efficient manner.

Mobile robots exist that move through a physical environment to accomplish a task. Such robots often include sensors, which, in addition to providing data for use by associated actuators in performing the task, allow the robot to detect physical phenomena in the environment, such as walls or other robots. In this way, the robot may avoid obstacles and/or locate items needed in performing the task.

SUMMARY

In one aspect, a robot system includes a robot operable to perform a task. A sensor associated with the robot is operable to detect local status data related to an environment of the robot. In addition, a receiver associated with the robot is operable to receive task data associated with performance of the task within the environment. A control module associated with the robot is operable to associate the local status data and the task data with a common time reference, such that the robot performs the task based on the local status data and the task data and in conjunction with the time reference.

Implementations may includes one or more of the following features. For example, the robot system may further comprise a virtual world that is in communication with the control module and that is operable to aggregate the local status data and the task data such that spatial and temporal properties of articles within the environment are replicated in the virtual world in conjunction with the time reference.

The robot may be mobile and the control module may direct movements of the robot in performing the task based on the virtual world. In the robot system, the task data may include a priority assigned to the robot system relative to one of the articles with respect to performance of the task.

In the robot system, the task data may include actual status data collected by separate sensors from the sensor associated with the robot and transmitted to the virtual world. The task data may include predicted status data describing a future position of one of the articles within the environment, with respect to the time reference. The task data may include instructions for implementing the task in the environment. The local status data and the task data may be continually collected and transmitted to the virtual world substantially in real-time.

In the robot system, each of the articles may be assigned a unique identifier in the virtual world. The virtual world may be operable to interface with a shared virtual world that aggregates data received from the articles. The unique identifiers may be unique across the shared virtual world.

In another aspect, data is collected at a sensor of a robot system to produce a first data stream. A second data stream, including instructions for the robot system to perform a task, is received at the robot system. The first data stream and the second data stream are aggregated with respect to a common time reference. The task is performed with the robot system in accordance with the first data stream, the second data stream, and the common time reference.

Implementations may include one or more of the following features. For example, receiving the second data stream may include receiving a third data stream compiled from separate sensors apart from the sensor of the robot system, the third data stream describing physical phenomena related to performance of the task.

Aggregating the first data stream and the second data stream may comprise including the first data stream and the second data stream in a virtual world in which spatial and temporal properties of real-world articles, as sensed by the sensor and the separate sensors, are represented.

Receiving the second data stream at the robot system may comprise receiving the second data stream via the virtual world. Telemetry data may be received from the virtual world at at least one of an enterprise application and a process control application. Performing the task may comprise transmitting instructions to the robot system from the enterprise application or the process control application via the virtual world based on the telemetry data.

The virtual world may be a local virtual world that is stored locally at the robot system, and including the first data stream and the second data stream in the virtual world may comprise determining that a communications link is available for communicating with a non-local virtual world that is stored apart from the robot system, and sharing information between the local virtual world and the non-local virtual world, using the communications link.

The second data stream may include predicted data that describes a spatial position of an article or event with respect to the robot system at a future time, relative to the common time reference. Receiving the second data stream may include receiving priority information that prioritizes operations of the robot system relative to articles encountered by the robot system during performance of the task.

The robot system may be mobile, and performing the task may comprise directing movement of the robot system and movement of articles relative to one another.

In another aspect, a robot system comprises a robot operable to perform a task. A sensor is operable to detect physical phenomena in a vicinity of the robot and output sensor data. A virtual world associated with a space-time continuum is operable to input the sensor data to replicate the physical phenomena with respect to the continuum. In addition, a control system is operable to direct the robot in performance of the task, based on the space-time continuum.

Implementations may include one or more of the following features. For example, the virtual world may be operable to receive task data that is related to performance of the task and incorporate the task data consistently with the space-time continuum. The virtual world may receive the task data from an enterprise application.

The robot may be mobile and the control module may guide movements of the robot relative to articles in the vicinity of the robot, based on the virtual world.

The details of one or more implementations are set forth in the accompanying drawings and the description below. Other features will be apparent from the description and drawings, and from the claims.

DETAILED DESCRIPTION

Figure 1:
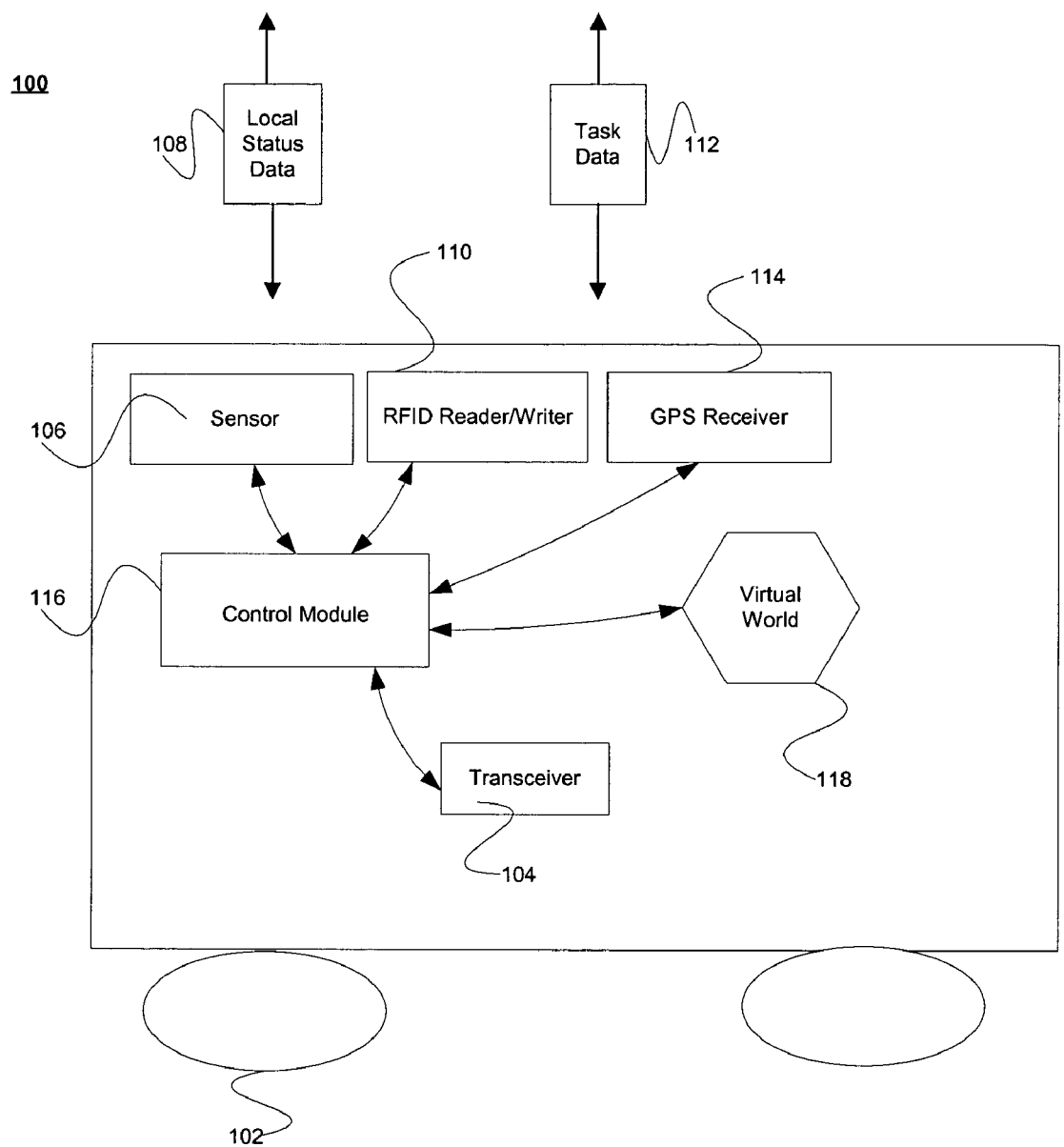
FIG. 1 is a block diagram of a robot system.

FIG. 1 is a block diagram of a robot system 100. Generally speaking, the robot system 100 is designed to perform a task with reduced or no manual supervision or control, and/or with remote manual control. The robot system 100 may represent, for example, a single robot equipped with various sensors and actuators designed to enable performance of a specific task or tasks.

For example, the robot system 100 may include various motion detectors or other types of environmental-awareness devices, designed to provide the robot system 100 with knowledge of its surroundings. As a further example, the robot system 100 may be equipped with arms or other appendages designed for a particular function, including moving, lifting, severing, attaching, or otherwise acting upon another object within the robot's immediate environment.

The robot system 100 also may represent multiple individual robots or mechanical devices that are utilized together to perform a task. The robot system 100 may represent a machine that is specifically designed to automatically and autonomously perform a task, or may be refer to equipment or machines, such as, for example, forklifts or bulldozers, that are augmented with the features described herein.

The robot system 100 may have to move about an area to perform its task(s). Movement of the robot system 100 may be facilitated by wheels 102. However, it should be understood that any type of motion-enabling techniques may be used to allow movement of the robot system 100. For example, the robot system 100 may be configured to slide along a rail or other pre-set path. As another example, the robot system 100 may use tank tracks, or may be lifted in a vertical direction to perform tasks by an internal riser, or by another device or robot. Although these and any other techniques may be used to move the robot system 100, it should be understood that the robot system 100 may be temporarily or permanently fixed or immobilized when performing a task.

The robot system 100 includes a transceiver 104 for sending and receiving data to and from, for example, other robots, applications, control systems, networks, or devices. The transceiver 104 may represent an integrated or separate transmitter and receiver. As discussed in more detail below, the transceiver 104 may be used in addition to, or as an alternative to, other communication techniques available to the robot system 100.

The robot system 100 further includes a sensor 106 that may be used to gather data about the environment of the robot system 100. As referred to above, the sensor 106 may represent any number or type of sensing device(s), including motion sensors, temperature sensors, pressure sensors, weight sensors, position sensors (e.g., valve position sensors), or any other type of sensor.

Thus, the sensor 106 inputs data about the surroundings or environment of the robot system 100, which is generally referred to herein as local status data 108. The local status data may be collected independently of, and need not refer to, any particular task or task. That is, the local status data 108 relates to existing conditions and circumstances that are detected, determined, or received by the robot system 100. For example, the local status data 108 may refer to a location, size, condition, or action of surrounding objects, or may refer to circumstances such as an ambient temperature, pressure, or to local weather conditions.

Although the local status data 108 referred to above as being collected by the sensor 106, it also may be collected by the transceiver 104, or by other sensors, or by other techniques that are discussed in more detail below. For example, local status data 108 may be collected by a Radio Frequency Identification (RFID) reader that is included with an RFID reader/writer 110 and discussed in more detail below. The robot system 100 may be programmed to continually roam an area, while continuously transmitting a stream of telemetry data that may include, for example, the local status data 108.

In addition to the local status data 108, the robot system 100 utilizes task data 112. The task data 112, in contrast to the local status data 108, generally includes information about a specific task that the robot system 100 is to perform, as well as information or instructions about how to perform the task.

The task data may be collected by non-robot systems external to the robot system 100, such as, for example, simple stationary sensors, and then transmitted to the robot system 100. The task data 112 may be generated, for example, in response to the local status data 108 collected by the continually roaming robot system 100, described above.

The task data 112 may include, for example, actual status data describing a current existing status of objects that may or may not be detectable or determinable by the robot system 100. For example, the actual status data may include a current position or activity of a separate robot system that may be out of range of the sensor 106 of the robot system 100, or may relate to information for which the robot system 100 does not possess an applicable sensor. As a result, there may be some overlap between the actual status data and the local status data; however, as defined herein, the actual status data refers to information that is generally more task-specific than the local status data.

The task data 112 also may include predicted status data, which relates to information about future conditions that are predicted to exist. For example, predicted status data may describe a future position of a robot (including the robot system 100 itself) or other device as it moves across a factory floor or other environment, or may describe the availability of a certain piece of data at some pre-determined time, or any other future event. Although it should be understood that predicted status data may change as time actually progresses (e.g., as exceptions arise), these changes may be mitigated by the constant review and revision of the actual status data and the predicted status data.

The task data 112 also may include navigational information that assists the robot system 100 in moving unimpeded through and around a given location. In FIG. 1, the robot system 100 includes a global positioning system (GPS) receiver 114 for this purpose. However, other navigational techniques may be used instead of, or in addition to, the GPS receiver 114. For example, mapping or route information may be received at the transceiver 104.

A control module 116 interacts with and directs system components, including, in FIG. 1, the transceiver 104, the sensor 106, the RFID reader/writer 110, and the GPS receiver 114, as well as any components for navigation and movement, such as, for example, the wheels 102. The control module 116 may be implemented using, for example, one or more of a processor (including a Digital Signal Processor (DSP)), a field-programmable gate array (FPGA), an application-specific integrated circuit (ASIC), other programmable logic or gate arrays, or programmable logic with a processor core.

The control module 116 also communicates with a virtual world 118 in real-time. Generally speaking, as discussed in more detail below, the virtual world 118 refers to a generic continuum including at least a collection of information about the spatial and temporal properties of a number of articles and the circumstances that surround those articles, including, in some implementations, rules governing interactions between the articles. For example, the collection of information could include at least the local status data and the task data discussed above, as well as other relevant information. The data may be transferred to the virtual world 118 using the control module 116, or may be input directly to the virtual world 118. Thus, the virtual world provides a holistic view of, for example, all the local status data and the task data relating to the number of articles.

More specifically, the virtual world 118 includes objects having a unique identity and a one-to-one correspondence with real-world articles, as well as context items having a one-to-one correspondence with circumstances affecting the articles. The virtual world 118 also may include rules affecting (or affected by) the objects (articles) and/or the context items (circumstances). Thus, the objects, context items, and rules are used to replicate real-world features and events, so that information about those features and events may be effectively tracked and shared.

The collection of information in a virtual world is typically aggregated from a number of sources using a predetermined timeline or time reference. Similarly, a common spatial (geographical) reference also may be used and applied to each of the sources (e.g., articles and circumstances). As a result, information as to where a particular article will be in a particular place, and when, is shared with anyone who has access to the virtual world. As described in more detail below, the virtual world 118 may be stored and accessed locally at the robot system 100, and/or may exist separately from the robot system 100.

Figure 2:
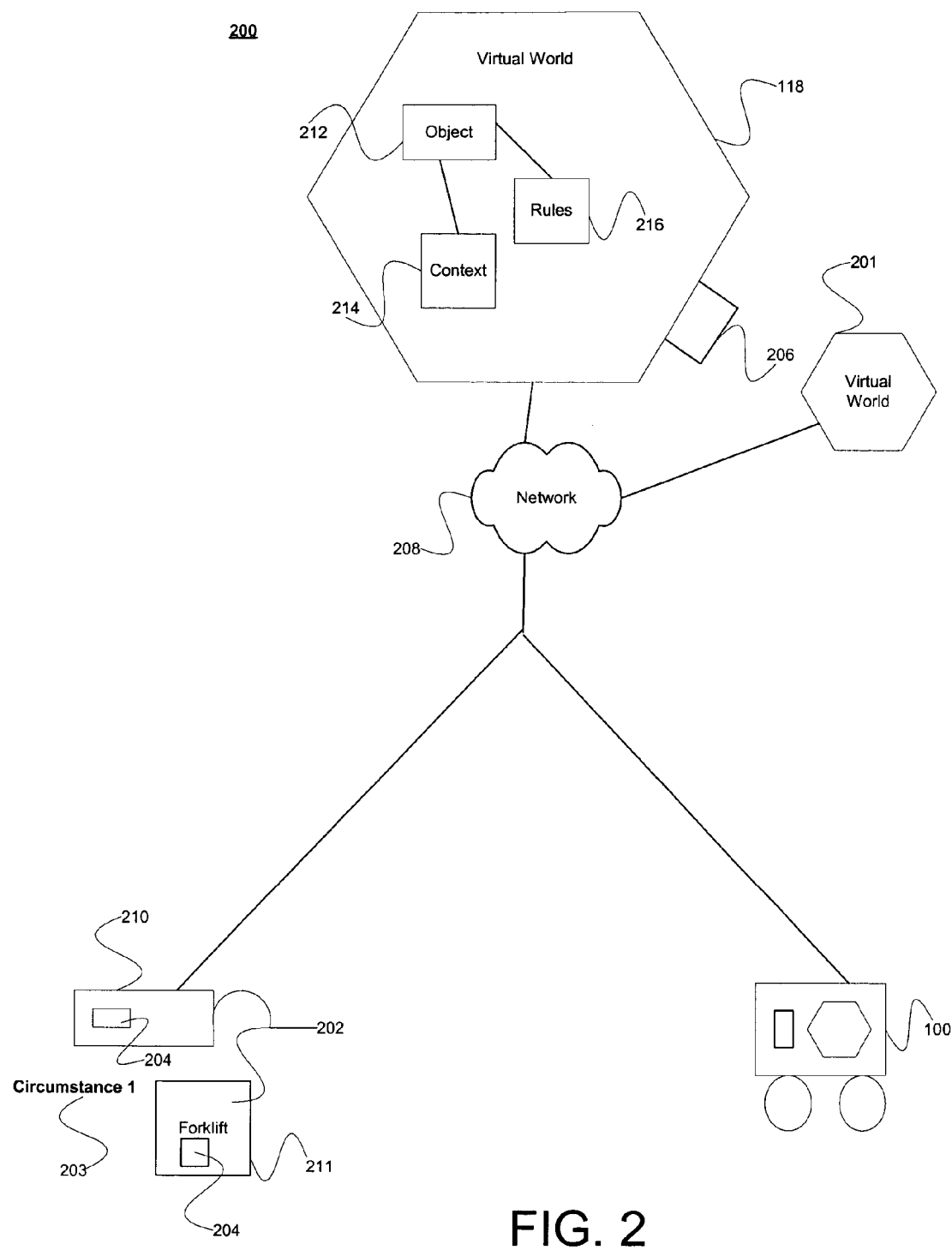
FIG. 2 is a block diagram of a virtual world.

FIG. 2 is a block diagram of a virtual world. In FIG. 2, the virtual world 118 may exist alone or may be coupled to other virtual worlds, such as, for example, a virtual world 201. The virtual world 118 may receive information from a variety of articles 202 in a variety of circumstances, such as, for example, a first circumstance 203. In this context, the term circumstance refers to any local aspect involving, surrounding, or affecting the article(s) 202. Circumstances may include, for example, local weather or other physical conditions described above in the context of the local status data and/or task data. Circumstances also may include instructions or other features that have been associated with the article(s) 202, such as, for example, an owner, a price, or a requirement imposed on one article to always move out of the way of a specific other articles when the paths of the two articles conflict.

Articles 202 may be tagged with unique identifiers 204 by an available tagging technology, such as, for example, active and passive RFID tags, barcodes, and tags that can be applied on a molecular basis. In FIG. 2, it should be understood that the robot system 100 is considered to be an article in the virtual world(s) 118 and/or 201, as a result, it too, may include the unique identifier 204.

The virtual world 118 may include, or be associated with, data input devices 206, such as, for example, tag readers (e.g., the RFID Reader/Writer 110), sensors (e.g., the sensor 106), and scanners. Through the data input devices 206, the virtual world 118 may continuously track and log state information of the articles 202 and the first circumstance 203 by reading the unique identifiers 204 and/or otherwise inputting relevant information.

The articles 202 may be coupled to the virtual world 118 through a network 208, such as, for example, an internet or other network connection (including wireless network connections), or may be coupled directly. The state information may include, for example, the local status data 108 and the task data 104. The virtual world 118 may be configured to receive information from the articles 202 using open interfaces, or using proprietary (or non-open) interfaces. In the latter case, the format of the information may be converted to be compatible with the virtual world 118.

When the virtual world 118 first becomes aware of an item, such as, for example, a box 210, which is to be moved by a fork lift 211, in the context of the first circumstance 203, the box 210 is "introduced" to the virtual world 118, and a corresponding "introduced" object 212 is created. The object 212 may be associated with a geographical description (e.g., latitude and longitude coordinates, or other positioning reference), and may be associated with a common timeline or time reference used by the virtual world 118 (e.g., assigned a "time-stamp"). Each introduced object 212 may be associated with its unique identifier, i.e., the unique identifier(s) 204. The unique identifiers 204 may be unique both within the virtual world 118, as well as across all communicating virtual worlds (e.g., the virtual world 201).

Thus, the virtual world 118 assigns a specific dynamic n-dimensional context 214 to the circumstance(s) 203 related to the introduced object 212. For example, depending on what circumstances the context 214 represents, the context 214 may include spatial (geographical) or temporal information. As other examples, the virtual world 118 may assign an owner, price, lot number, and temperature to the context 214 associated with the introduced object 212.

As mentioned above, the virtual world 118 also may attach rules 216 to the introduced object 212. For example, the virtual world may attach a rule specifying that if the temperature of the corresponding box 210 reaches level y, then cause action z. For example, if the box 210 contains frozen items, the rules 216 may require that the virtual world 118 signal an alarm if the temperature rises above freezing.

The virtual world 118 may include predicted status data associated with the article 202, which, as referred to above, may be included in the task data 112 that instructs the robot system in performing its task. For example, the article 202 may report to the virtual world 118 that it will be at a certain location at a certain time, so that the robot system 100 may take this information into account when, for example, planning a movement route. Such predicted status data and its use is enabled as a result of the fact that the virtual world 118 has a common timeline or time reference for all of its associated objects 212 (articles 202), contexts 214 (circumstances 203), and rules 216, so that the status prediction of one article has meaning to all of the other articles. Moreover, even if the article 202 were delayed in arriving, the robot system's 100 movement route could then be dynamically altered, so that it would take into account the delay of the article 202.

Based on the above, the virtual world 118 and other virtual worlds discussed herein should be understood to represent at least any application or technique for spatially and temporally tracking real-world articles and circumstances and/or rules that affect those articles. The tracking may be performed continuously and/or in real-time, and may utilize common spatial and temporal coordinates, so as to form a virtual space-time continuum that generically interfaces with multiple data inflows and outflows. As a result, queries may be run about a tracked article to determine past collected information related to the article, such as, for example, the local status data 108 of a specific article at a specific location or time. Similarly, queries also may be made relating to the (predicted) future of an article. In these ways, and as described in more detail below, robot systems such as the robot system 100 may be more effectively utilized in a variety of contexts.

Specific examples of implementations of a virtual world are described in, for example, (i) U.S. application Ser. No.: 10/136,851, filed Apr. 30, 2002, and titled "CONTEXT-AWARE AND REAL-TIME TRACKING;" (ii) (i) U.S. application Ser. No.: 10/136,846, filed Apr. 30, 2002, and titled "EXCHANGE OF ARTICLE-BASED INFORMATION BETWEEN MULTIPLE ENTERPRISES;" and (iii) U.S. application Ser. No.: 10/137,207, filed Apr. 30, 2002, and titled "BI-DIRECTIONAL DATA FLOW IN A REAL-TIME TRACKING SYSTEM."

Figure 3:
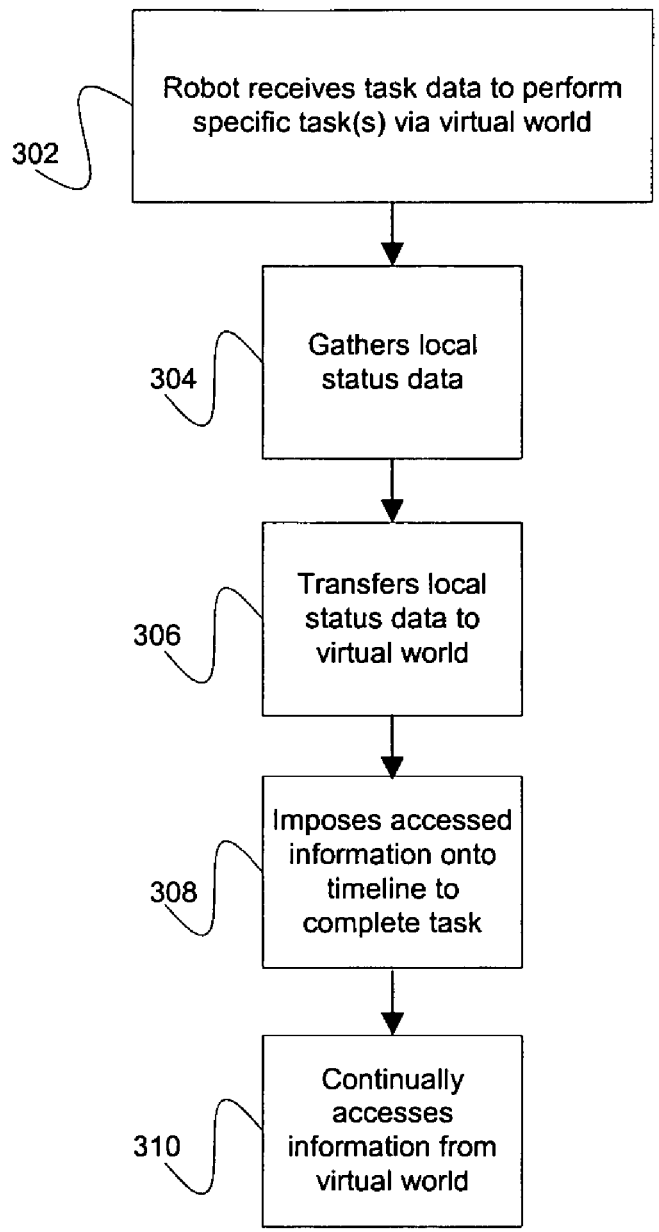
FIG. 3 is a flow chart of a general process of the robot system of FIG. 1.

FIG. 3 is a flow chart of a general process of the robot system of FIG. 1. In FIG. 3, the robot system 100 receives the task data 112 related to perform a specific task or tasks (302) in the context of the first circumstance 203. The task data may be received from the virtual world 118. In response, the robot system 100 may move to and/or through a location of the first circumstance 203, gathering the local status data 108 as it proceeds (304). Of course, the robot system 100 already may be in the vicinity of the circumstance 203, in which case, as should be understood from the above description of FIG. 1, most or all of the local status data 108 may already have been (or is being) collected.

The robot system 100 transfers the local status data 108 to the virtual world 118 in real time (306). The robot system 100 may then impose the local status data 108, including information about the circumstance 203, onto the timeline of the virtual world 118 (308), along which the robot system will proceed (310) to most efficiently complete the assigned task.

It should be understood that the processes of FIG. 3 may be performed in a different order than is shown in FIG. 3. The process may be performed linearly, or sub-sets of the processes may be performed iteratively before proceeding to the next part of the process (e.g., data may be collected and exchanged with the virtual world multiple times before the task is commenced). Other combinations also are possible.

As a result of the processes of FIG. 3, and as discussed in more detail below, the robot system 100 performs its tasks in an efficient and effective manner. For example, the robot system 100 may easily avoid real-world articles as it moves about, since the robot system has knowledge of those articles from the virtual world 118. This ability extends beyond simply avoiding stationary objects, and includes the ability to avoid an area when the robot system 100 has advance knowledge from predicted status data included in the task data 112 that, for example, another robot will be in that area at a certain time.

When the robot system 100 is constantly collecting the local status data 108 as it moves about, this information is available to the virtual world 118, and hence to other members of the virtual world 118, even if it is not immediately pertinent to the task at hand of the robot system 100.

Similarly, but conversely, the robot system 100 has access to information (e.g., the local status data) of other articles and systems that is reported to, and included in, the virtual world 118. For example, if the robot system 100 requires the assistance of another article or type of article (e.g., a fork lift) to perform a task, it will be able to select and work with the fork lift that is currently closest by and that is not otherwise occupied, since all of this information will be available to the robot system 100 from the virtual world 118. In addition, the robot system 100 may be able to utilize components that it itself may not possess (e.g., infrared sensors) but that objects in its vicinity do possess.

Moreover, to the extent that the virtual world 118 provides a common language, or at least a common point of reference, between multiple articles, the ability of the robot system 100 to receive instructions (task data 112) from multiple sources is enabled or facilitated. For example, as discussed in more detail below, the robot system 100 may receive instructions from a process control system or an enterprise application that may not otherwise be able to meaningfully convey instructions to the robot system 100.

Still further, and as alluded to above, the number and type of interactions that the robot system 100 may have with other articles is increased. For example, the rules 216 may dictate interactions (or prohibited interactions) with other articles. In one implementation discussed in more detail below, priorities are assigned to articles with respect to one another, so that, even irrespective of the particular task being performed and its associated instructions, the most important tasks or considerations of an overall system may be implemented.

For example, if the robot system 100 is associated with carrying a particular chemical, such as a hazardous or toxic chemical, it may be prioritized to move through a space relative to other articles. In other words, other articles will automatically move out of the way of the robot system 100, so as to minimize an amount of time that the chemical is in transit. In this example, then, an article performing a task will have advance warning that the robot system 100 will be in its vicinity. The article may thus stop its task temporarily, move out of the way while the robot system 100 moves through the area, and then resume its task when safe. This sequence of events may happen even with no specific instructions being passed to the article to pause its task, as long as the article has access to the relevant virtual world.

Figure 4:
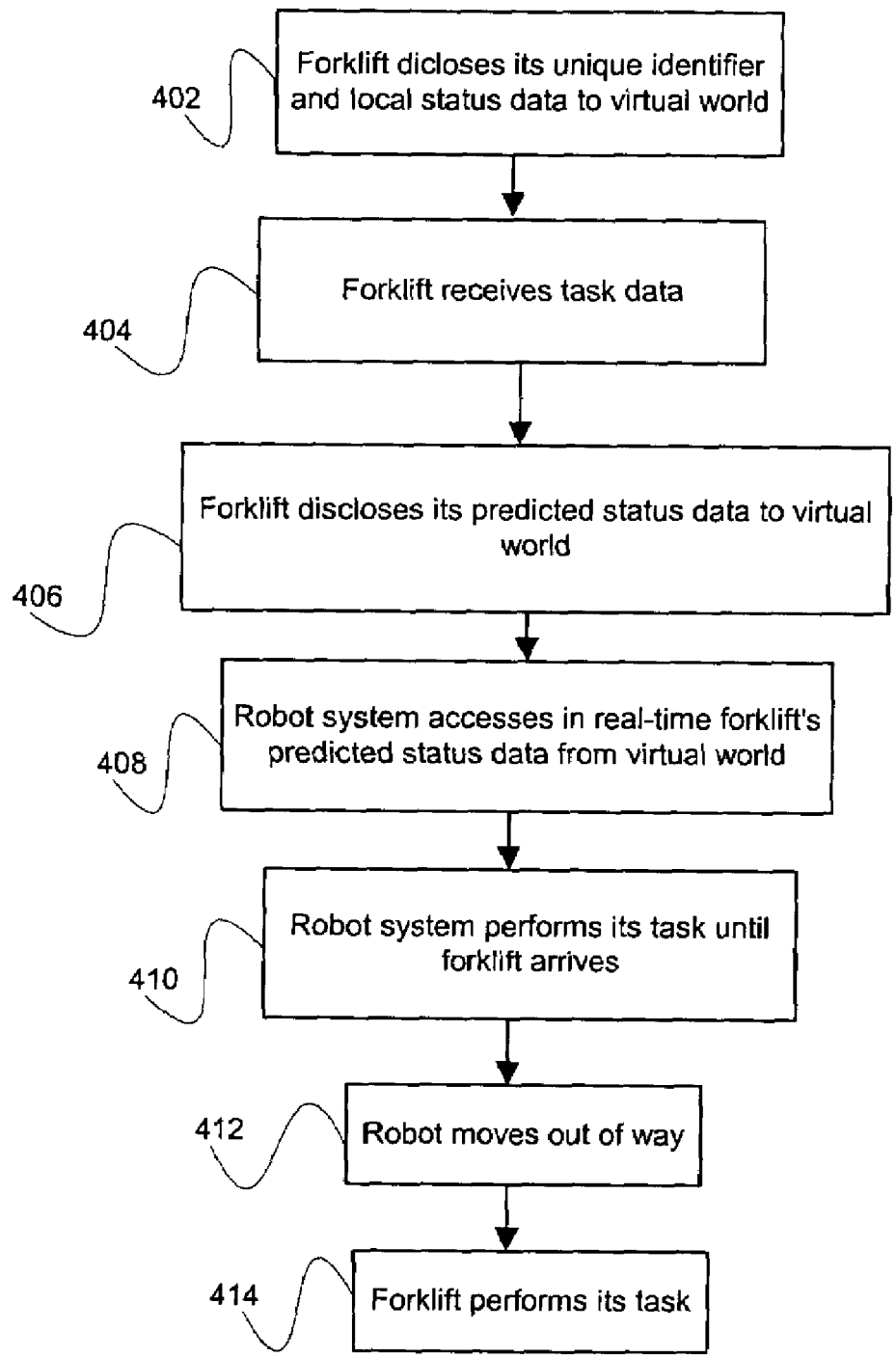
FIG. 4 is a flow chart of the robot system of FIG. 1 performing a task.

FIG. 4 is a flow chart of the robot system of FIG. 1 performing a task. Specifically, in FIG. 4, the fork lift 211 performs the task of moving the box 210, where the robot system 100 is assigned to prepare the box 210 before the box 210 is moved by the fork lift 211, i.e., without interfering with the fork lift 211.

First, if not already done, the fork lift 211 identifies itself to the virtual world 118 via its unique identifier 204 and local status data (402). For example, if the fork lift 211 is associated with its own virtual world (which may be local or separate from the fork lift 211), then that virtual world may access, or integrate with, the virtual world 118.

The fork lift 211 then receives task data from the virtual world(s) (404) that instructs the fork lift 211 in how to perform its task. The fork lift 211 shares the task data, including its predicted status data, with the virtual world 118 (406). As a result, the robot system 100 has access to this predicted status data and other relevant task data (408).

Thus, whenever a task at a new location is being assigned to the fork lift 211, the fork lift 211 discloses its predicted location to the virtual world 118 (and any other relevant virtual world). In addition to the fork lift's unique identifier, the predicted status data may contain at least a future location in space and time and a future time stamp. For example, at 12:25:30 PM PST, Oct. 22, 2002, the fork lift 211 discloses a predicted status data set to the virtual world 118, which may include the following information: the fork lift's unique ID, the future location's latitude, longitude and altitude, and an estimated arrival time, such as, for example, 12:28:00 PM PST, Oct. 22, 2002.

Since the robot system 100 has real-time access to this predicted status data via the virtual world 118, as just described, the robot system 100 prepares the box 210 before and until the forklift 211 arrives (410). The robot system 100 then moves out of the way of the fork lift 211 (412) shortly before the fork lift 211 arrives. Accordingly, the fork lift 211 performs its assigned task of moving the box 210 (414).

Figure 5:
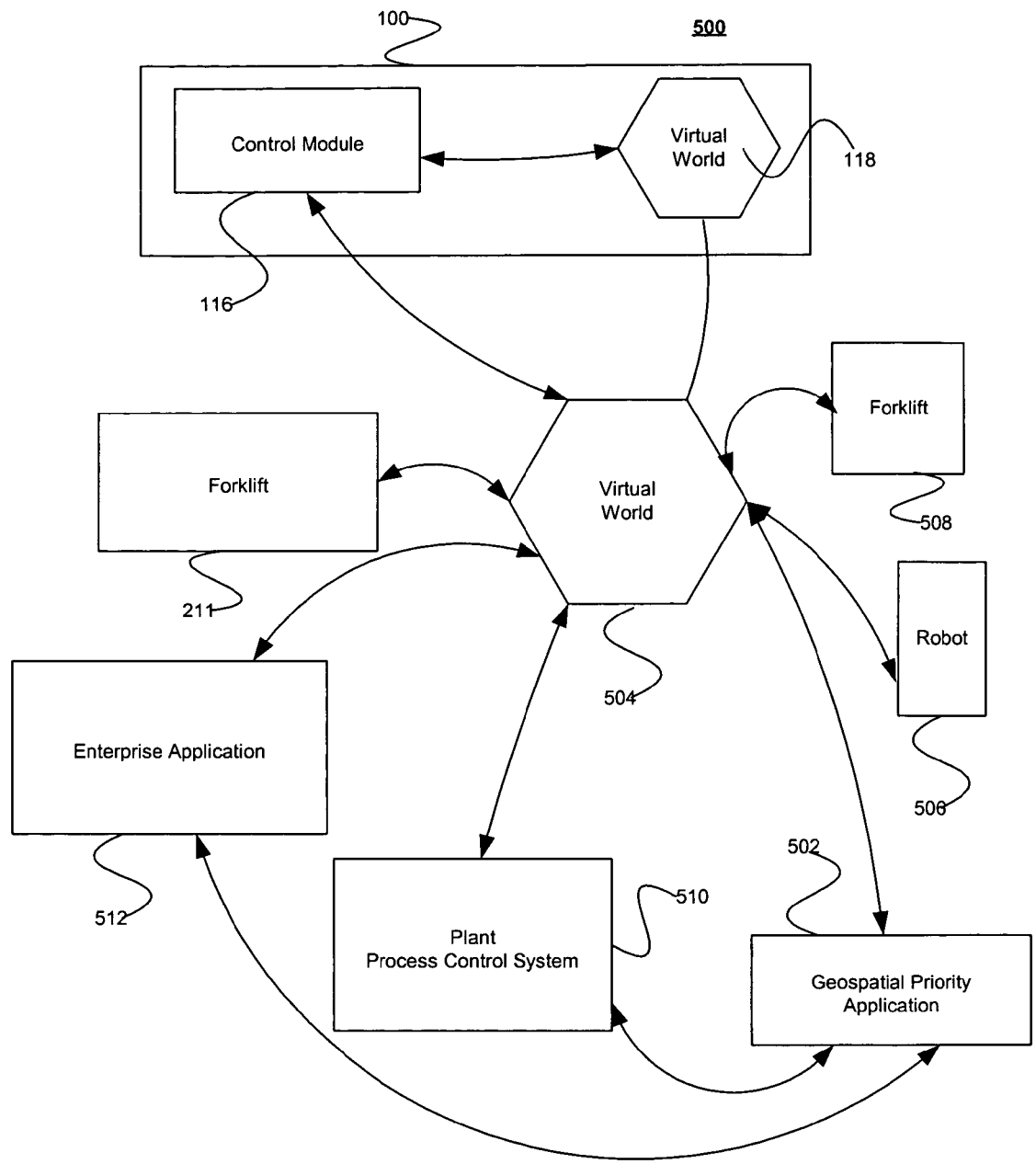
FIG. 5 is a block diagram of a warehouse implementation using a virtual world.

FIG. 5 is a block diagram of a warehouse implementation using a virtual world. In FIG. 5, a multitude of robot systems and fork lifts, such as those described above, are deployed in a warehouse setting 500.

In the warehouse setting 500, a geospatial priority application 502 is connected with a virtual world 504, which, in turn, in connected with the virtual world 118 of the robot system 100 (shown in a condensed form in FIG. 5). Of course, the geospatial priority application 502 also may be connected directly to the virtual world 118.

The geospatial priority application 502 dynamically assigns priorities for specific locations in space and time to the connected robot systems and fork lifts. In this context, a priority setting refers to an assignment of priority within and among the various real-world articles represented in the virtual worlds 118 and 504 (e.g., in FIG. 5, the various robot systems and fork lifts). As a result, a robot system or fork lift that has a lower priority will move out of the way of, for example, a second robot system 506 or a second fork lift 508 with a higher priority for a specific location in space and time. Since priorities are assigned with reference to a specific space and time, it may be the case that the robot system 506 has a higher priority than the robot system 100 in one context, while the priorities between the two may reversed in another space and time.

A plant process control system 510 refers to an application or other technique for managing operations within the warehouse setting 500. Many warehouse settings might be expected to have at least a rudimentary form of such a control system, so as to manage operations of the warehouse. For example, such a control system might implement inventory management techniques, including the input/output and/or counting of pieces of inventory; e.g., stocking shelves with received inventory products, or picking particular pieces of inventory from shelves for shipment to customers.

However, the interface between such a control system, if any, and robot systems performing tasks in the warehouse setting, may be problematic. In contrast, the virtual world 504 provides a common language or setting between the process control system 510 and the articles (e.g., the robot systems 100 and 506, and the fork lifts 211 and 508). Moreover, different types of process control systems may interact with the various articles, using the virtual world 504. In this way, existing warehouse management techniques may be easily implemented in conjunction with the robot system 100.

Similarly, an enterprise application 512 that controls the warehouse 500 business processes may be used in conjunction with the robot system 100 and other articles. Such an enterprise application, by itself, is often found in the context of implementing business processes, such as the business decisions of how much inventory to order, when to place such an order, how to price or ship the inventory, or any of a number of other business decisions.

Such enterprise applications, however, are often even more disconnected from actual operations on the warehouse floor than the control system 510. Often, the enterprise application 512 may be operated by business, e.g., management, personnel, who may have no direct knowledge into the processes of running the warehouse setting 500. As a result, business decisions may be made that make sense from a purely business perspective, but that are not cost-effective to implement as a practical matter.

For example, a business decision may be made to reduce the price of a particular product type, so as to rapidly reduce inventory of that product type. However, the product may be stored in a location within the warehouse setting 500 such that it is extremely time-consuming or impractical to access large numbers of the product.

In the warehouse setting 500 of FIG. 5, however, the enterprise application 512 may interact with the various articles (e.g., robot systems and fork lifts) by way of the virtual world 504. In this way, business personnel are able to interact with operations of the warehouse setting 500 itself, so that fewer employees are required to manage the warehouse setting 500, and, moreover, the warehouse setting 500 may be managed in a manner that is expedient from both a warehouse management and a business perspective. In addition, real-time visibility (e.g., real-time visibility to the enterprise application 512) of inventory, assets, machinery, or production processes may be possible.

In FIG. 5, it should be understood that the virtual world 118 of the robot system 100 need not always be connected to, or in communication with, the virtual world 504. For example, when the robot system 100 is mobile, it may be the case that the robot system 100 is required to perform a task that requires moving out of a range of communication with the virtual world 504.

At this point, the virtual world 118 may go off-line of the virtual world 504, during which time it may continue to gather data and perform assigned tasks. As soon as robot system 100 gains (or re-gains) access to the collectively-used virtual world 504, the robot system 100 may transmit data from the virtual world 118 to the collectively used virtual world 504, and thus merge the gathered data from the virtual world 118 with the data of the collectively used virtual world 504. As a result, data gathered by the robot system 100 would then become visible to all articles having access to the virtual world 504, including the second robot system 506 and the second fork lift 508.

Accordingly, the robot system 100 or other articles may perform its (their) task(s) either off-line or on-line with the shared virtual world 504. Over time, a scope of the shared virtual world may be expanded, as it collects information from the various articles. In the meantime, the individual articles may continue to perform their respective tasks in an effective manner.

Numerous examples of additional implementations are possible. As an example of one such implementation, a robot system may be used to transport meat or other perishable items in or around a warehouse. As described above, the robot system may continually furnish data that is tracked and recorded in a virtual world. As a result, if the meat is found to be spoiled, a history of the robot system may be investigated, and potential sources or reasons for the spoilage may be detected. For example, it may be detected that a temperature of the meat became too high when the meat was temporarily stored in a particular location.

As another example, it may be the case that a robot is tasked with performing a task that is generally repetitive, but that may potentially vary from day to day. For example, a robot system may be tasked with re-filling vending machines used to dispense, for example, soft drinks or other snack items. If the robot system has a pre-determined route that is repeated daily, it may be the case that the robot system frequently encounters a full vending machine (in which case the trip was wasted), or an empty vending machine (in which case profits may have been lost while the vending machine sat empty).

Using the robot system of FIG. 1 or FIG. 5, or similar systems, and as referred to above, a dynamic re-routing may take place in which the robot system deviates from its pre-determined route to, for example, avoid a full vending machine or proceed immediately to an empty one. Whether a vending machine is full or empty may be detected by sensors local to the machine(s), and reported to the relevant virtual world(s). Similarly, if a vending machine becomes broken, vandalized, or otherwise disabled, it may be repaired before further profits are lost.

During such dynamic re-routing, or more generally, a robot system may send an announcement or broadcast of its task data to all articles in its vicinity, using the virtual world(s). As a result, the articles may prepare themselves accordingly at an appropriate time before the arrival of the robot system. For example, the door to a vending machine may open itself with an associated actuator, or a separate robot may move out of the path of the robot system before the robot system is actually present (i.e., within range of the relevant sensors).

In addition to being efficient, the above-described implementations are very robust. That is, conventional systems are generally sensitive to exceptions, such as, for example, a misplaced tool or object that may impede the progress or function of a robot in the system. This is because robot systems having access to virtual worlds as described herein have access to redundant information, such as alternate routes or alternate components (e.g., robots) for performing the same task.

Implementations may have central control of multiple robot systems and related components. In other implementations, the robot systems may operate in a peer-to-peer manner, in which case, for example, data for virtual worlds is generally shared equally between all participating robot systems.

A number of implementations have been described. Nevertheless, it will be understood that various modifications may be made, and the implementations may be used in multiple other contexts, including, for example, a retail sales environment, supply-chain management, a hospital environment, or a construction site. Accordingly, other implementations are within the scope of the following claims.

What is claimed is:

1. A robot system comprising:
   a robot operable to perform a task;
   a sensor associated with the robot and operable to detect local status data related to an environment of the robot;
   a receiver associated with the robot and operable to receive task data associated with performance of the task within the environment; and
   a control module associated with the robot and operable to associate the local status data and the task data with a common time reference, such that the robot performs the task based on the local status data and the task data and in conjunction with the time reference.

2. The robot system of claim 1, further comprising a virtual world that is in communication with the control module and that is operable to aggregate the local status data and the task data such that spatial and temporal properties of articles within the environment are replicated in the virtual world in conjunction with the time reference.

3. The robot system of claim 2 wherein the robot is mobile, and wherein the control module directs movement of the robot in performing the task based on the virtual world.

4. The robot system of claim 2 wherein the task data includes actual status data collected by separate sensors from the sensor associated with the robot and transmitted to the virtual world.

5. The robot system of claim 2 wherein the task data includes predicted status data describing a future position of one of the articles within the environment, with respect to the time reference.

6. The robot system of claim 2 wherein the task data includes instructions for implementing the task in the environment.

7. The robot system of claim 2 wherein the local status data and the task data are continually collected and transmitted to the virtual world substantially in real-time.

8. The robot system of claim 2 wherein the robot system and each of the articles are assigned a unique identifier in the virtual world.

9. The robot system of claim 8 wherein the virtual world is operable to interface with a shared virtual world that aggregates data received from the articles.

10. The robot system of claim 9 wherein the unique identifiers are unique across the shared virtual world.

11. The robot system of claim 2 wherein the task data includes a priority assigned to the robot system relative to one of the articles with respect to performance of the task.

12. A method comprising:
    collecting local status data at a sensor of a robot system;
    producing a first data stream, the first data stream representing the collected local status data;
    receiving a second data stream at the robot system, the second data steam including instructions fro the robot system to perform a task;
    associating the first data stream and the second data stream with a common time reference; and
    performing the task using the robot system based on the first data stream and the second data stream and in conjunction with the common time reference.

13. The method of claim 12 wherein receiving the second data stream includes receiving a third data stream compiled from separate sensors apart from the sensor of the robot system, the third data stream describing physical phenomena related to performance of the task.

14. The method of claim 13 wherein aggregating the first data stream and the second data stream comprises including the first data stream and the second data stream in a virtual world in which spatial and temporal properties of real-world articles, as sensed by the sensor and the separate sensors, are represented.

15. The method of claim 14 wherein receiving the second data stream at the robot system comprises receiving the second data stream via the virtual world.

16. The method of claim 14 wherein the virtual world is a local virtual world that is stored locally at the robot system, and wherein including the first data stream and the second data stream in the virtual world comprises:

determining that a communications link is available for communicating with a non-local virtual world that is stored apart from the robot system; and sharing information between the local virtual world and the non-local virtual world, using the communications link.

17. The method of claim 13 comprising receiving telemetry data from the virtual world at at least one of an enterprise application and a process control application.

18. The method of claim 17 wherein performing the task comprises transmitting instructions to the robot system from the enterprise application or the process control application via the virtual world based on the telemetry data.

19. The method of claim 12 wherein the second data stream includes predicted data that describes a spatial position of an article or event with respect to the robot system at a future time, relative to the common time reference.

20. The method of claim 12 wherein receiving the second data stream includes receiving priority information that prioritizes operations of the robot system relative to articles encountered by the robot system during performance of the task.

21. The method of claim 12 wherein the robot system is mobile, and further wherein performing the task comprises directing movement of the robot system and movement of articles relative to one another.

22. A robot system comprising:
a robot operable to perform a task;
a sensor operable to detect physical phenomena in a vicinity of the robot and output sensor data;
a virtual world associated with a space-time continuum and operable to input the sensor data to replicate the physical phenomena with respect to the continuum; and
a control system operable to direct the robot in performance of the task, based on the space-time continuum.

23. The robot system of claim 22 wherein the virtual world is operable to receive task data that is related to performance of the task and incorporate the task data consistently with the space-time continuum.

24. The robot system of claim 23 wherein the virtual world receives the task data from an enterprise application.

25. The robot system of claim 23, wherein the robot is mobile, and further wherein the control module guides movement of the robot relative to articles in the vicinity of the robot, based on the virtual world.

* * * * *